United States Patent [19]

Seager

[11] Patent Number: 4,548,524

[45] Date of Patent: Oct. 22, 1985

[54] DISPENSING PACKAGE WITH APPLICATOR SURFACE

[75] Inventor: Richard H. Seager, Mystic, Conn.

[73] Assignee: Calumet Manufacturing Co., East Orange, N.J.

[21] Appl. No.: 400,758

[22] Filed: Jul. 22, 1982

[51] Int. Cl.$^4$ .................. A45D 34/00; A46B 11/02
[52] U.S. Cl. .................. 401/187; 222/205; 401/189; 401/262; 401/269; 401/270
[58] Field of Search .............. 401/143, 187, 189, 269, 401/270, 271, 276, 146, 188, 262; 222/205

[56] References Cited

U.S. PATENT DOCUMENTS

| | | |
|---|---|---|
| 641,503 | 1/1900 | Fisk . |
| 1,048,255 | 12/1912 | Winkelmiller et al. ......... 401/146 X |
| 1,194,642 | 8/1916 | Kleeberg ................ 401/187 |
| 2,027,656 | 1/1936 | Tassie .................. 401/187 |
| 2,594,083 | 4/1952 | Silver .................. 401/189 |
| 2,816,309 | 12/1957 | Worth et al. ............. 401/262 X |
| 2,922,178 | 1/1960 | Kelly .................. 401/271 |
| 3,767,088 | 10/1973 | Deussen . |

FOREIGN PATENT DOCUMENTS 913371 12/1962 United Kingdom ................ 401/188

Primary Examiner—Steven A. Bratlie
Attorney, Agent, or Firm—St.Onge Steward Johnston & Reens

[57] ABSTRACT

Disclosed is a package for dispensing flowable materials such as powders and liquids, particularly those intended for cosmetic use. A cover (30) fits snugly against chamber wall (12) and overlies dispensing opening (14). Removal of the cover draws a measured quantity of flowable product (50) through conduit (40) and out of the dispensing opening. A vent opening (22) through the chamber wall is preferably provided to permit the interior of the chamber to adjust to atmospheric pressure. And, a cover relief opening (32) is preferably provided to permit easy replacement of the cover and control of the quantity of product dispensed.

17 Claims, 6 Drawing Figures

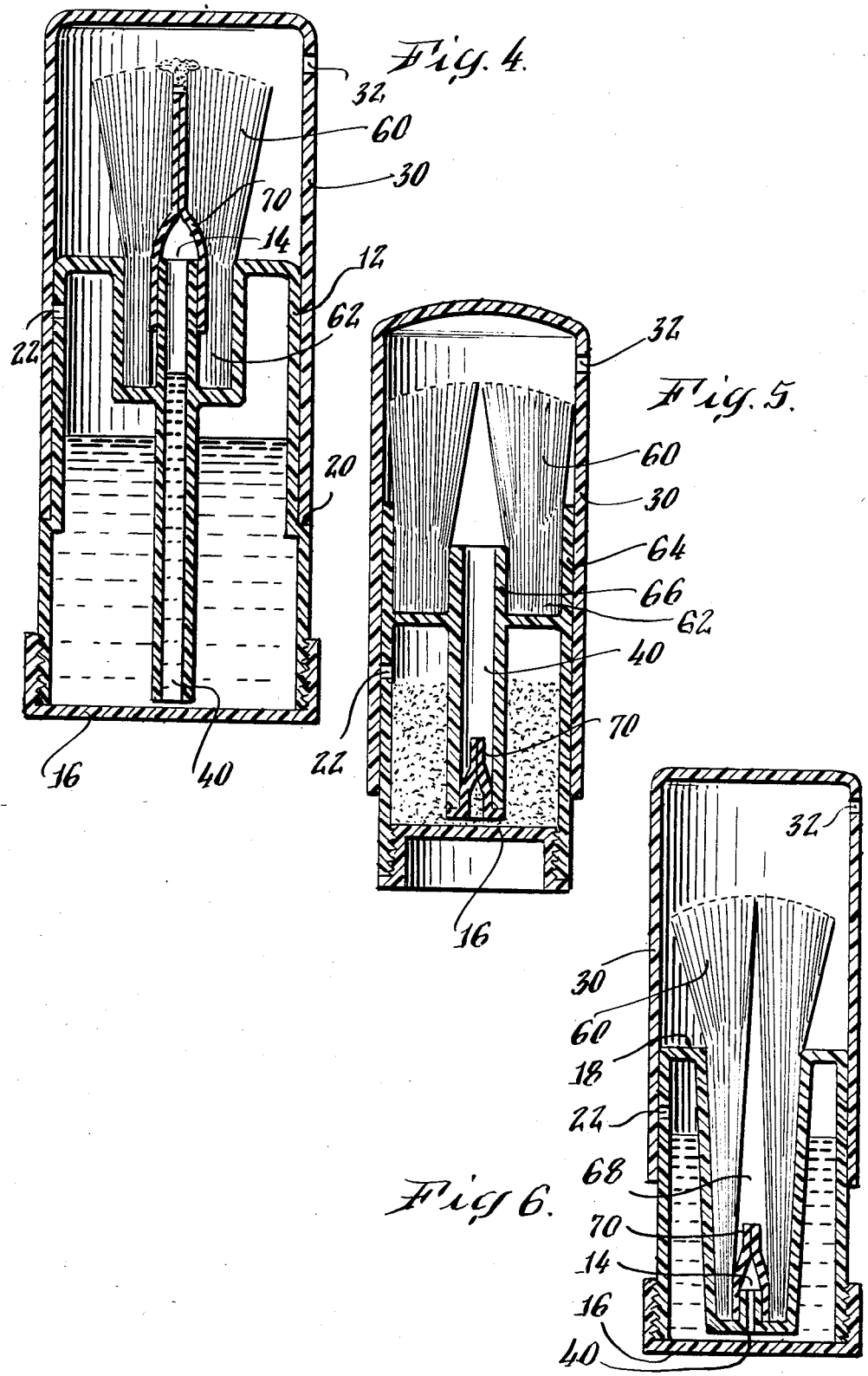

DISPENSING PACKAGE WITH APPLICATOR SURFACE

TECHNICAL FIELD

The present invention relates to dispensing packages and particularly to those capable of simply and rapidly dispensing a measured amount of a flowable material such as a cosmetic liquid or powder.

The art has long endeavored to provide dispensing packages of this type. However, most such packages have required the use of a separate plunger-operated pump or have otherwise complicated the basic design of the container and made it not only more expensive, but less pleasing in design.

BACKGROUND ART

In U.S. Pat. No. 3,767,088 to Deussen, there is disclosed a closure device for use with a liquid container which provides a piston on the interior of a cap to draw a predetermined amount of liquid into a measuring beaker by the suction force created by moving the piston within the measuring beaker. However, because the liquid is drawn into a recessed beaker area, the device is not readily adaptable for use with thick creams which could not be poured from the beaker or powders which would then have to be applied to a separate applicator means. Similarly, in U.S. Pat. No. 641,503 to Fisk, there is disclosed a device for filling fountain pens which provides a piston which fits within a pen reservoir such that withdrawal of the reservoir from around the piston will fill the reservoir. Again here, this device is not adaptable for dispensing powders or viscous liquids such as cosmetic creams. Moreover, the device is even more unsightly and less convenient than the conventional plunger-type pumps often employed with viscous cosmetic liquids.

Accordingly, it would be desirable to have a package for dispensing flowable materials such as powders and liquids, of the type typically employed for cosmetic use, which would dispense a measured quantity of the flowable material in a manner which makes it readily available for application or other use. And, it would be especially desirable to have such a package in an aesthetically pleasing form.

DISCLOSURE OF INVENTION

The invention provides a dispensing package capable of dispensing flowable materials such as cosmetic liquids and powders. Also provided is a packaged product employing the dispensing package. In its broad aspects, the dispensing package comprises a chamber having a dispensing opening with a conduit extending from the dispensing opening into the interior of the chamber and a cover overlying the dispensing opening and engaging at least a portion of the outer wall of said chamber so that removal of the cover creates a partial vacuum and causes flow from the chamber through the dispensing opening.

The package according to the present invention has the advantage that viscous liquids such as cosmetic creams can be drawn directly through the opening onto an applicator surface which can be employed to directly apply the material to the intended surface or for application to the fingers for application as desired. Another advantage of the invention is that powderous material, as well as liquids, can be dispensed in the amounts desired directly into a flexible applicator such as a brush or the like.

BRIEF DESCRIPTION OF THE DRAWINGS

The present invention will be better understood and its advantages will become more apparent when the following detailed description is read in light of the accompanying drawings wherein:

FIG. 4 is a vertical cross section through a container according to the present invention adapted for dispensing powders or liquid materials directly into a brush applicator;

FIG. 5 is a vertical cross sectional view of an alternative embodiment to that shown in FIG. 4; and FIG. 6 is a vertical cross section showing a modified material holding chamber for a device similar to that shown in FIG. 5.

BEST MODE FOR CARRYING OUT THE INVENTION

The dispensing packages according to the present invention enable the simple and direct dispensing of flowable materials of all types, including cosmetic liquids and powders, glue, machine lubricants, pharmaceutical preparations for topical application, shaving cream, various marking materials, and the like. The invention is applicable to dispensing all types of materials which can be drawn from the interior of the package by a partial vacuum created by withdrawing the cover. To simplify the description, the following discussion will focus upon the utility of dispensing powders and liquids employed for cosmetic uses.

Figure 1:
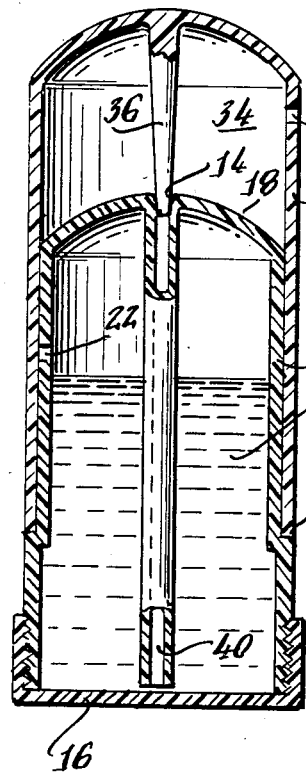
FIG. 1 is a vertical cross section of a dispensing package according to the invention.

Referring to FIG. 1, the dispensing package of the invention is seen to comprise three principal parts, the chamber generally designated as 10 for holding the flowable material, the cover 30 which engages outer side wall portion 12 of the chamber 10, and the conduit 40 which provides communication between the interior of chamber 10 with a dispensing opening 14 which extends through the chamber wall. The chamber 10, and especially the outer chamber wall 12, preferably has a circular cross section transverse to the axis of movement of the cover 30. The circular cross section is preferred because it simplifies tolerance control during the molding procedure and because it permits the easiest replacement and withdrawal of the cover from the chamber where minor imperfections in the sizing of either exist. However, any other suitable cross section can be employed, inluding square, rectangular, oval or the like. Also, if desired, the inside surface of the cover 30 and the exterior of side wall 12 of the chamber can have a mating spiral or thread-like configuration. While adequate sealing for the purposes of the invention is achieved through proper control of the molding process, it may be desired to provide an integrally-molded or separately-attached annular sealing member either at the top portin of the outer wall 12 of the chamber 10 or at the lower portion of the cover 30.

Figure 2:
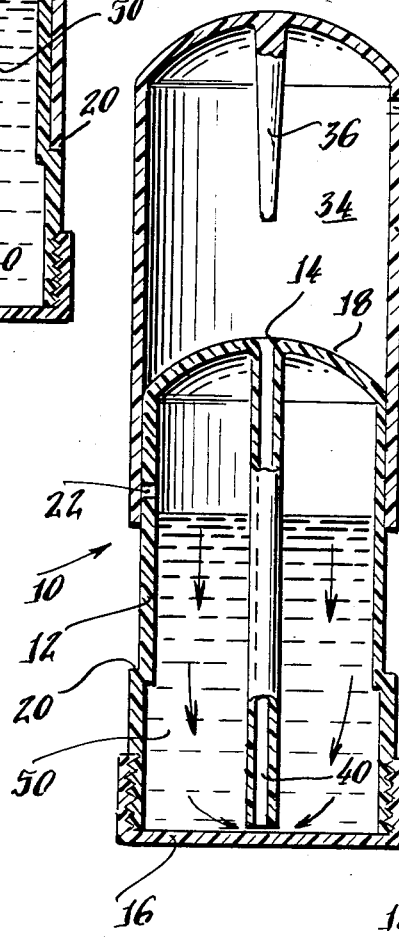
FIG. 2 illustrates the flow of material caused by partially withdrawing the cover from a container as shown in FIG. 1.
Figure 3:
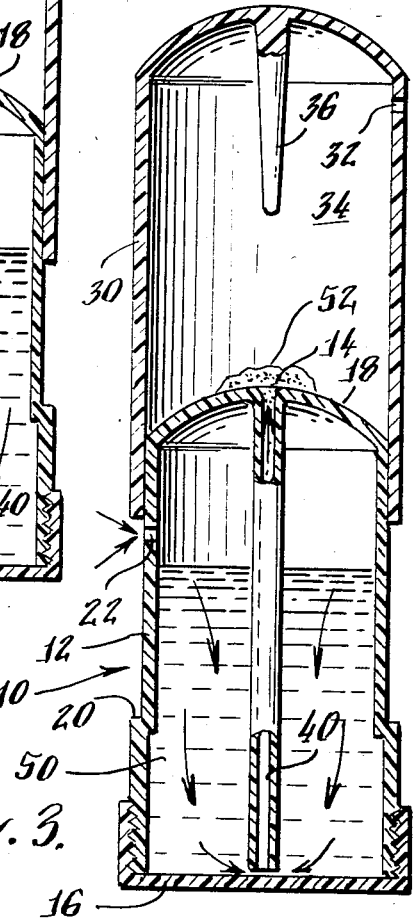
FIG. 3 shows the flow of material during the last stage of withdrawal of the cover from a container as shown in FIG. 1.

Before describing in detail the other refinements of the package according to the invention and the alternative embodiments as shown in FIGS. 4–6, reference is made to FIGS. 1–3 to explain the operation of the package. The package is shown in these figures in a vertically upright position resting on a bottom portion 16 and having the dispensing opening 14 in a chamber top wall portion 18. The conduit 40 extends from an open end near the bottom of the interior of the chamber 10 up to and in communication with the dispensing opening 14. A liquid material 50 is shown to partially fill the interior of the chamber 10. As the cover 30 is slidably withdrawn from the chamber 10 as shown in FIG. 2, the volume in the space 34 between the top of the cover 30 and the chamber top wall portion 18 is increased. This causes a reduction in pressure within the space 34 which results in a differential pressure between the space 34 and the interior of the chamber 10. As shown in FIG. 2, material begins to flow to equalize the pressures causing the liquid 50 to flow through the conduit toward and through the dispensing opening 14 in the chamber top wall portion 18. The amount of material withdrawn by the removal of the cover can be controlled by controlling the distance of vertical movement of the cover 30 along the outer side wall portion 12 of the chamber 10. Accordingly, a stepped portion or annular ridge 20 preferably extends around the periphery of the chamber 10 to define the closed position of the cover. If desired, the stepped portion can provide a more exaggerated neck and, the outer wall 12 can be snap fit or threadably engaged to a lower container portion which forms the main fluid material holding chamber.

It is desired for dispensing some materials to provide a chamber vent opening 22 through the chamber side wall portion 12 to permit the pressure within the chamber 10 to readjust to atmospheric pressure during the final stages of withdrawal of the cover, as shown in FIG. 3. While the vent opening 22 is not required for all materials and in all cases, it lessens the tendency of the metered portion of material 52 from being being partially withdrawn back into the chamber 10 upon complete removal of the cover 30 due to the presence of a reduced pressure condition still existing within the chamber 10. Where employed, the vent opening 22 should be of such a size and location to adequately permit ambient air to enter the chamber 10, but not to permit the flowable material 50 from being forced or drained out or otherwise discharged. Typically, this can be achieved by employing a number of very small holes spaced around the periphery of the side wall portion 12 at a height above the liquid level within the chamber 10. Upon complete removal of the cover 30, the metered portion of flowable material 52 can be applied directly to the skin by rounded chamber top wall 18, or it can be simply removed with the fingers and applied as otherwise desired.

After use in the manner described, the cover 30 is simply telescoped about the chamber side wall 12 and moved downwardly to its closed position as defined by annular ridge 20. To permit the cover 30 to be easily replaced on the chamber 10, it is preferred to provide a cover relief opening 32. As the cover 30 is slid downwardly toward the fully closed position, the space 34 is reduced, causing an increase in pressure therein. The cover relief opening 32 permits air to escape from the space 34, thereby permitting the cover to be fully closed without any tendency to pop open. The cover relief opening 32 is also useful for controlling the quantity of the product dispensed during withdrawal of the cover. The size of the opening 32 can be varied as desired during production of the packages to achieve the desired degree of control. Where the full predetermined metered amount of flowable material is desired by the user, the cover relief opening 32 is simply covered with a finger as the cover is withdrawn. Where less than that amount is desired, the opening 32 can be left uncovered and the cover withdrawn at a rate which the user will find suitable for dispensing a desired amount of material.

It is an advantage of the present invention that the package can be employed with materials which will not flow readily through a channel, such as provided in conduit 40, unless forced by a pressure differential. Materials of this type would have a consistency similar to hand creams and the like. For the more readily flowable materials or where there may be cause for storage of the container in other than the full upright position as shown in the drawings, the cover can conveniently include means for sealing the dispensing opening 14 when the cover is in the closed position. Thus, as is shown in the drawings, a stopper 36 is shown to extend downwardly from the inner top wall of the cover 30 to stopper the opening 14. While not shown in the drawing, it may be desirable to provide a snap fit either between the stopper 36 and the opening 14, or between the cover 30 and the chamber side wall 12 to maintain the stopper 36 in position to fully close the opening 14.

Referring now to FIGS. 4–6, there is seen a series of alternative embodiments according to the present invention. All parts in FIGS. 4–6 which are fully equivalent to those described previously will carry the same reference numerals and will not be described again. Similarly, parts among the different embodiments shown in FIGS. 4–5 which are equivalent will bear the same reference numerals. All of these alternate embodiments are suitable for dispensing viscous liquids such as shaving cream and powderous materials such as talcum powder; FIGS. 4 and 6 show liquids while FIG. 5 indicates a powderous material as illustrative.

Referring now to FIG. 4, there is seen a dispensing package according to the invention which includes a flexible applicator, specifically shown here as a brush means 60 concentrically positioned about the dispensing opening 14. A flexible, one-way bladder valve 70 is shown overlying dispensing opening 14. The valve means 70 permits flow of material from the chamber through the opening 14 and into the brush 60 upon withdrawal of the cover 30 from the chamber wall 12, but retards inward flow of either the dispensed material of air upon replacement of the cover 30. The brush means 60 is secured in any suitable manner to the body of the chamber 10, but here is shown to be inserted within an annular recess 62 formed between a depressed area of the chamber top wall portion 18 and the conduit 40. In operation, removal of the cover 30 will cause the liquid flowable material within the chamber to rise up through dispensing opening 14 and one-way valve means 70 into the brush means 60 to permit simplified application of liquid materials. The same principle can be applied equally well to use with powderous materials, with the one-way valve 70 permitting cleaning of the brush means 60 after use without substantial danger of water entering into the interior of chamber 10.

Referring now to FIG. 5, there is seen an alternative embodiment wherein the cover 30 telescopes the chamber 10 along its complete vertical length, not having an annular ridge such as that shown as 20 in FIGS. 1–4 for stopping the downward vertical movement. FIG. 5 also shows the annular channel 62 for holding the brush means 60 to be formed by an upward extension 64 of the chamber side-wall portion 12 and an outwardly extending portion 66 of the conduit 40. It is also seen that the flexible one-way valve 70 is fixed to the lower end of conduit 40 within the chamber 10 and is shorter than that in FIG. 4. The shorter bladder is most satisfactory for use with powders which are to be held within the brush. For liquids, the longer bladder valve of FIG. 4 is preferred because it would deposit the liquid at the brush tip. With the exception of these differences, the function of the dispensing packaging of FIG. 5 is essentially as described with regard to the other embodiments.

FIG. 6 shows an alternative arrangement, for use with any of the previous embodiments, wherein a recessed chamber 68 is provided within the chamber top wall 18. According to this embodiment, the conduit 40, which can be integrally molded with the chamber top wall 18 is shown to project upwardly from the bottom of the recess 68 and have the dispensing opening 14 at the top of the conduit 40. Positioned over the top of the conduit 40 is a one-way valve 70 similar to that shown in FIGS. 4 and 5.

The above description has been for the purpose of teaching the person skilled in the art how to make and use the present invention. It has not been intended to describe each and every obvious modification and variation of the invention which will become apparent to the skilled worker upon reading the description. It is intended, however, to include all such modifications and variations within the scope of the invention, which is defined by the following claims.

I claim:

1. A dispensing package for a flowable product comprising: means forming a chamber having a dispensing opening in an applicator surface on said package; a conduit extending from said dispensing opening into the interior of said chamber; and a cover overlying said opening and closely fitted to the outer wall of said chamber whereby removing said cover causes flow from said chamber through said dispensing opening and onto said application surface.

2. A package according to claim 1 which further comprises a sealing means located within said cover for sealing said dispensing opening when said cover is moved toward said opening.

3. A package according to claim 1 which further includes a vent opening through said wall of said chamber, said vent opening positioned such that it is closed by said cover when said cover is fully closed on said package.

4. A package according to claim 1 which further includes a cover relief opening through said cover.

5. A package according to claim 1 which further includes valve means associated with said conduit which permits flow, out of said conduit upon removal of said cover and restricts inward flow through said conduit into said chamber.

6. A package according to claim 1 which further includes brush applicator means adjacent to said dispensing opening.

7. A package according to claim 6 wherein said brush means is mounted substantially concentrically about said dispensing opening and there is provided a bladder valve in the path of flow through said conduit.

8. A package according to claim 1 wherein said chamber has a circular cross section transverse to the axis of movement of the cover.

9. A package according to claim 8 which further includes an annular ridge which extends around the periphery of said chamber, said ridge defining the closed position of said cover.

10. A dispensing package for a flowable product comprising: means forming a chamber for holding a flowable material, comprising a top surface having a dispensing opening therethrough, a bottom, and a sidewall; a conduit in communication with said dispensing opening and extending toward said bottom of said chamber; and a cover adapted to closely fit the periphery of said side wall and to move from a closed position to an open position whereby flowable material maintained within said chamber is drawn out of said chamber through said conduit and beyond said dispensing opening as said cover is moved from said closed position to said open position.

11. A package according to claim 10 wherein said chamber has a circular cross section transverse to a long axis extending through said top and bottom.

12. A package according to claim 11 which further includes a stopper on said cover for engaging and sealing said dispensing opening when said cover is in said closed position.

13. A package according to claim 10 which further includes a cover relief opening through said cover and a vent opening through said side wall, said vent opening positioned such that it is closed by said cover when said cover is in said closed position and opened when said cover is moved to a predetermined position.

14. A packaged product comprising: a flowable product maintained within a chamber comprising a top wall having an opening therethrough for dispensing said product, a bottom wall, and a sidewall; a conduit positioned within said chamber, having an open end juxtaposed with said bottom wall and an opposite end in communication with said opening through said top wall; and a cover which tightly engages said side wall whereby said product is caused to flow through said conduit and said opening when said cover is removed from said side wall of said chamber.

15. A packaged product according to claim 14 wherein said sidewall comprises a cylinder having an annular ring spaced from said top wall to define a closed position for said cover.

16. A packaged product according to claim 14 wherein said flowable product comprises a viscous liquid.

17. A packaged product according to claim 14 wherein said flowable product comprises a powder.

* * * * *